US008564501B2

(12) United States Patent  (10) Patent No.: US 8,564,501 B2
Karasawa  (45) Date of Patent: Oct. 22, 2013

(54) IMAGE DISPLAY SYSTEM

(75) Inventor: Toru Karasawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 13/064,227

(22) Filed: Mar. 11, 2011

(65) Prior Publication Data

US 2011/0164008 A1  Jul. 7, 2011

Related U.S. Application Data

(63) Continuation of application No. 11/091,333, filed on Mar. 29, 2005, now abandoned.

(30) Foreign Application Priority Data

Mar. 31, 2004  (JP) ................................. 2004-101630

(51) Int. Cl.
  *G09G 5/00* (2006.01)
(52) U.S. Cl.
  USPC .......................................... 345/2.2; 345/698
(58) Field of Classification Search
  USPC .......................................... 345/2.1–2.2, 698
  See application file for complete search history.

(56) References Cited

U.S. PATENT DOCUMENTS

| 6,195,068 | B1 | 2/2001 | Suzuki et al. |
| 6,489,936 | B1 | 12/2002 | Gormish |
| 6,943,752 | B2 | 9/2005 | Masumoto et al. |
| 2002/0015004 | A1 | 2/2002 | Chino et al. |
| 2002/0122158 | A1 | 9/2002 | Miyashita et al. |
| 2003/0169264 | A1 | 9/2003 | Emerson et al. |

FOREIGN PATENT DOCUMENTS

| EP | 1 289 298 A1 | 3/2003 |
| EP | 1 385 336 A2 | 1/2004 |
| JP | A-10-326091 | 12/1998 |
| JP | A-2002-057964 | 2/2002 |
| JP | A-2002-236640 | 8/2002 |
| JP | A-2003-111054 | 4/2003 |
| JP | A-2003-167725 | 6/2003 |
| JP | A-2004-023664 | 1/2004 |
| JP | A-2004-242117 | 8/2004 |
| WO | WO 01/93583 A1 | 12/2001 |
| WO | WO 02/071380 A2 | 9/2002 |

*Primary Examiner* — Michael Pervan
(74) *Attorney, Agent, or Firm* — Oliff & Berridge PLC (57) ABSTRACT

An image display system that includes an image supply device, a projector, and a network for connecting the image supply device and the projector. When images are supplied to the projector via the network from the image supply device, the images are projected by the projector. When projecting and displaying a second image having a second image size based on a first image having a first image size in a projection screen of the projector, the image supply device generates supplied image data including first image data for representing the first image, position data for indicating the display position of the second image in the projection screen, and second image size data for indicating the second image size, and also supplies this to the projector via the network. By doing this, increases in network traffic for the image display system are suppressed.

8 Claims, 5 Drawing Sheets

SCREEN UPDATE MESSAGE STRUCTURE

| | DATA SIZE | DATA VALUE | DATA DESCRIPTION |
|---|---|---|---|
| MESSAGE HEADER PART | 1 | 0 | MESSAGE TYPE: SCREEN UPDATE |
| | 1 | | PADDING |
| | 2 | 1 | CHANGE AREA COUNT |
| PARAMETER PART | 2 | | CHANGE AREA X COORDINATE |
| | 2 | | CHANGE AREA Y COORDINATE |
| | 2 | | CHANGE AREA WIDTH (SOURCE IMAGE WIDTH) |
| | 2 | | CHANGE AREA HEIGHT (SOURCE AREA HEIGHT) |
| | 4 | | ENCODING FORMAT |
| | 1 | | IMAGE TYPE (0: EQUIVALENT, 1: EXPANDED/REDUCED) |
| | 2 | | WIDTH AFTER EXPANSION/REDUCTION |
| | 2 | | HEIGHT AFTER EXPANSION/REDUCTION |
| | n | | CHANGE AREA IMAGE DATA (SOURCE IMAGE DATA) |

⬇ EXPANDED DISPLAY (B)

IMAGE DISPLAY SYSTEM

This is a Continuation of application Ser. No. 11/091,333 filed Mar. 29, 2005. The disclosure of the prior application is hereby incorporated by reference herein in its entirety.

BACKGROUND OF THE INVENTION

1. Field of the Invention

The present invention relates to an image display system comprising an image supply device and a projector connected via a network, and particularly relates to an image display system that is suitable for displaying of moving images.

2. Description of the Related Art

In the past, a projector for which a personal computer (hereafter abbreviated as "PC") which is an image supply device and a projector are connected via a network, and that is able to supply and display an image from the PC to the projector (hereafter called a "network projector") was proposed (e.g. see International Publication Pamphlet No. 01/093583).

Also, an art called VNC (Virtual Network Computing) is used to supply images from a PC via a network to this kind of network projector.

However, with VNC, of the images generated by the image supply device, image data of the area for which the image has changed (change area) (e.g. bit map data or JPEG data) is transferred. Because of this, when the size of the change area is large and the data volume of the image data to be transferred is large, there is the problem that the network traffic increases, and the response worsens.

For example, compared to a case of displaying a moving image at a certain screen size (hereafter called "standard screen size"), when displaying a moving image on a screen size that is expanded bigger than the standard screen size (hereafter also called the "expanded screen size"), the data volume per frame of the moving image becomes greater. Because of this, when displaying a moving image at the expanded screen size, the data volume required for realizing a real time moving image display is increased compared to when displaying a moving image at the standard screen size. As a result, when displaying a moving image at the expanded screen size, if the network data transmission speed is fixed, the number of frames of a moving image that can be displayed per unit of time will be less than when displaying a moving image at the standard screen size, and there are cases when real time moving image display is not possible.

SUMMARY OF THE INVENTION

Therefore, an object of the present invention is to solve the problems of the prior art noted above by providing an image display system that is able to inhibit an increase in network traffic.

In order to attain at least part of the above and the other related objects, the present invention is directed to an image display system comprising an image supply device, a projector, and a network for connecting the image supply device and the projector, supplying images from the image supply device to the projector via the network, and projecting and displaying the images by way of the projector. The image supply device, in case of projecting and displaying a second image having a second image size based on a first image having a first image size in the projection screen of the projector, generates supplied image data including first image data for representing the first image, position data indicating the display position of the second image in the projection screen, and second image size data indicating the second image size, and supplies the supplied image data to the projector via the network.

With the image display system of the present invention, because rather than the projected and displayed second image, the first image which is the source of the second image is transmitted to the projector, even when the second image size is larger than the first image size, for example, the actually transmitted data volume can be made smaller than when transmitting image data that represents the second image, it is possible to inhibit increasing of network traffic, and to greatly improve the response.

For the image display system of the present invention, it is preferable that the projector generates second image data representing the second image based on the first image data and the second image size data included in the supplied image data, and projects the second image in the projection screen based on the generated second image data and the position data included in the supplied image data.

In this way, by the projector generating second image data that represents the second image based on the first image data and the second image size data included in the supplied image data and comprising a function of projecting the second image in the projection screen based on the generated second image data and the position data included in the supplied image data, even when supplied image data that includes first image data, position data, and second image size data is supplied via a network from an image supply device, it is possible to project a second image without problems.

For the image display system of the present invention, it is also possible to have first image size data that indicates the first image size be included in the supplied image data.

By doing this, because it is not necessary to obtain the first image size based on the first image data at the projector, this is convenient when generating second image data based on the first image data.

It is also possible to further have data that indicates whether the second image size is an equal size or is an expanded or reduced size in relation to the first image size included in the supplied image data.

By doing this, it is possible to know at the projector whether this is an equal size or an expanded or reduced size in relation to the second image size without comparing the first image size and the second image size, which is convenient when generating second image data.

The present invention is also directed to an image supply device capable of supplying images to a projector via a network. In case of projecting and displaying a second image having a second image size based on a first image having a first image size in the projection screen of the projector, the image supply device generates supplied image data including first image data representing the first image, position data indicating the display position of the second image in the projection screen, and second image size data indicating the second image size, and supplies the supplied image data to the projector via the network.

In this way, according to the image supply device of the present invention, rather than a second projected and displayed image, a first image which is the source of a second image is transmitted to a projector, so even in a case when the second image size is greater than the first image size, for example, it is possible to make the actually transmitted data volume smaller than when transmitting image data representing the second image, making it possible to inhibit an increase in network traffic, and to greatly improve the response.

The present invention is also directed to a projector capable of receiving supply of images from an image supply device via a network. In case of projecting and displaying a second image having a second image size based on a first image having a first image size in a projection screen of the projector, when supplied image data including first image data representing the first image, position data indicating the display position of the second image in the projection screen, and second image size data indicating the second image size is supplied from the image supply device to the projector via the network, the projector generates second image data representing the second image based on the first image data and the second image size data included in the supplied image data, and projects the second image in the projection screen based on the generated second image data and the position data included in the supplied image data.

In this way, according to the projector of the present invention, by having a function of generating second image data representing the second image based on the first image data and the second image size data included in the supplied image data, and projecting the second image in the projection screen based on the generated second image data and the position data included in the supplied image data, even when supplied image data including the first image data, the position data, and second image size data is supplied via the network from the image supply device, it is possible to project the second image without problems.

Note that the present invention is not limited to the device invention aspects of the image display system, image supply device, and projector and the like noted above, and may also be realized in a method invention format such as an image supply method.

Furthermore, it is also possible to realize various embodiments such as an embodiment of a computer program for forming these methods or devices, embodiments as recording media on which this kind of computer program is recorded, or data signals which are realized within a carrier wave including the aforementioned computer program.

DESCRIPTION OF THE PREFERRED EMBODIMENTS

Figure 1:
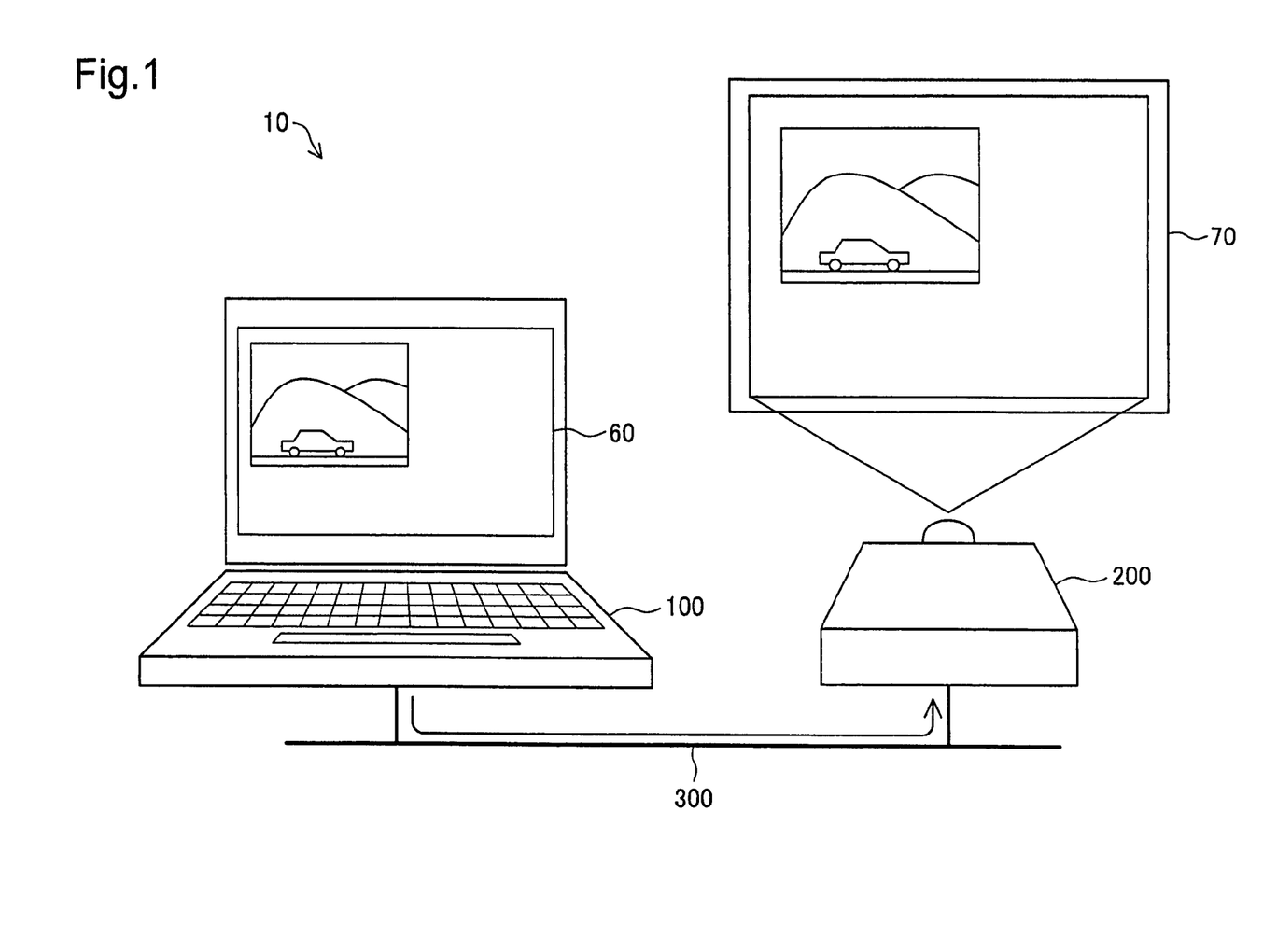
FIG. 1 is a structural diagram showing an overview of an image display system as an embodiment of the present invention.

Following, aspects of the present invention are described based on embodiments in the following sequence.
A. Image Display System Summary:
B. Image Display Operation:
C. Effect:
D. Variation Example:
A. Image Display System Summary:

FIG. 1 is a structural diagram showing an overview of an image display system as an embodiment of the present invention. As shown in FIG. 1, the image display system 10 of this embodiment comprises a notebook PC 100 which is the image supply device, a projector 200 for projecting and displaying an image supplied from the PC 100, and a network 300 that connects the PC 100 and the projector 200. It is also possible to further connect a plurality of PCs, projectors, and other peripheral devices.

In this way, the image display system 10 of this embodiment connects the PC 200 and the projector 200 via the network 300, displays an image on a display screen 60 of a display that the PC 100 has, and also supplies images from the PC 100 to the projector 200, so that images are projected and displayed on a projection display screen 70 by the projector 200. At this time, the PC 100 supplies to the projector 200 image data (e.g. bit map data, JPEG data, etc.) for images of the area for which the images change (rectangular area) of the images displayed on the display screen 60. Note that hereafter, areas for which images change are also simply called "change areas." Then, the projector 200 uses image data for the supplied change area and does display after updating only the images of the area corresponding to the change area of the image that is projected and displayed in the projection display screen 70. However, in the past, as image data for change areas, image data equivalent to the change area screen size was supplied as is, but with this embodiment, as is described later, image data that is the source for generating image data equivalent to the change area screen size (hereafter called "source image data") is supplied.

Figure 2:
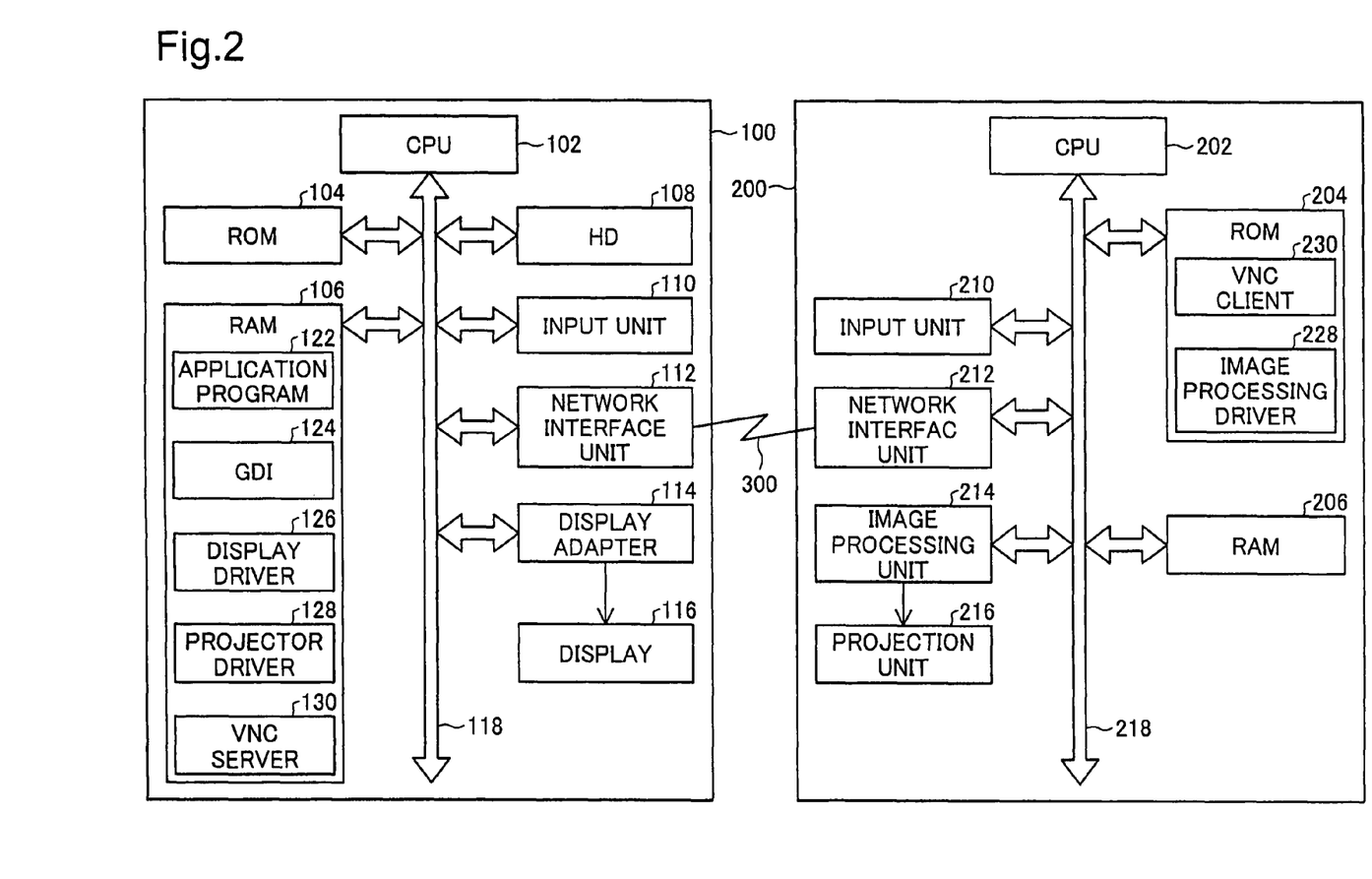
FIG. 2 is a block diagram respectively showing the schematic structures of a PC 100 and projector 200 of FIG. 1.

FIG. 2 is a block diagram respectively showing the schematic structure of the PC 100 and the projector 200.

The PC 100 comprises a CPU 102, a ROM 104, a RAM 106, a hard disk drive 108, an input unit 110 comprising a keyboard and pointing device or the like, a network interface unit 112, a display adapter 114, a display 116 consisting of a liquid crystal display or the like, and a bus 118 for connecting these components. Of these, stored in RAM 106 are various computer programs such as an application program 122, a graphical device interface (GDI) 124, a display driver 126, a projector driver 128, and a VNC server 130. Note that the GDI 124, the display driver 126, the projector driver 128 and the like function as part of the operating system. Note that with this embodiment, we are assuming the operating system to be Windows (registered trademark) offered by Microsoft Corp.

These types of various computer programs are provided in a format recorded on a computer readable recording medium such as a flexible disk or CD ROM or the like. The PC 100 reads the computer programs from that recording medium, and either directly transfers this to the RAM 106 which is the internal memory device, or stores it once in a hard disk drive 108 or the like which is an external memory device, after which it transfers it to the RAM 106 when activating. Alternatively, it is also possible to supply computer programs to the PC 100 via the network 300 or the like. When realizing the functions of a computer program, a computer program stored in the RAM 106 is executed by the CPU 102 which is the microprocessor. It is also possible to have the PC 100 read and directly execute a computer program recorded on a recording medium.

Note that as the "recording medium" for this invention, it is also possible to use various computer readable media such as a flexible disk or CD ROM, a optical magnetic disk, an IC card, a ROM cartridge, a punch card, a printed item printed with a code such as a bar code, an internal memory device of a computer (memory such as RAM or ROM), or an external memory device.

Meanwhile, the projector 200 comprises a CPU 202, a ROM 204, a RAM 206, an input unit 210 consisting of operating buttons or the like, a network interface unit 212, an image processing unit 214, a projection unit 216 consisting of a light source lamp, a liquid crystal panel, a projection optical system and the like, and a bus 218 for connecting these components. Of these, stored in the ROM 204 are various computer programs such as an image processing driver 228 and a VNC client 230. When realizing the functions of a computer program, a computer program stored in the ROM 204 is executed directly, or, after being transferred to the RAM 206, is executed by the CPU 202 which is the microprocessor.

Figure 3:
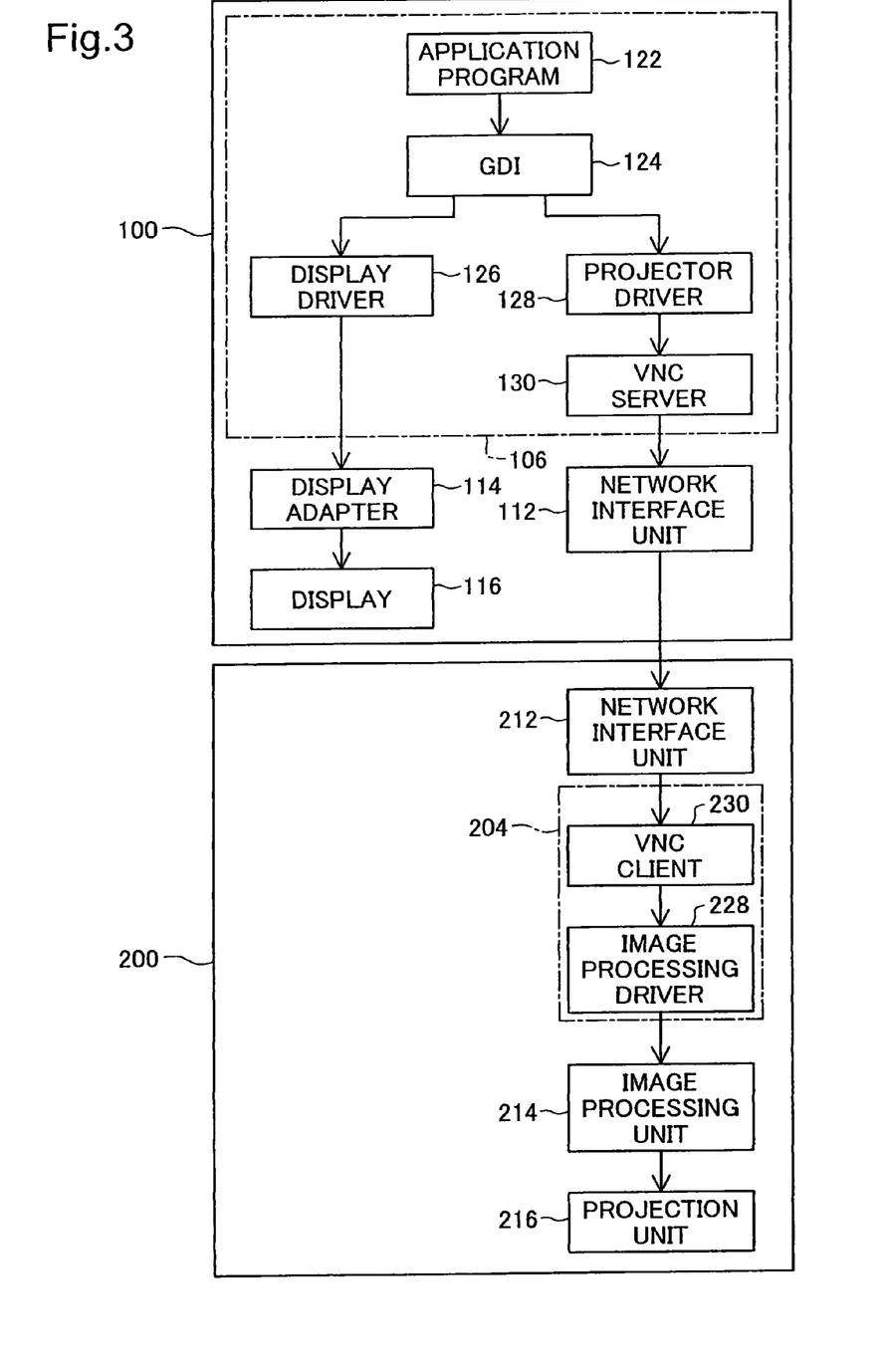
FIG. 3 is an explanatory diagram for explaining the operation procedure when displaying an image in the image display system of FIG. 1.

B. Image Display Operation:

FIG. 3 is an explanatory diagram for explaining the operating procedure when displaying an image with the image display system of FIG. 1. Note that with the following explanation, as an example of an application program 122, we will give the description assuming execution of Windows Media Player (registered trademark) offered by Microsoft Corp.

First, of the moving image files stored in the hard disk drive 108, when the application program 122 executes play of a moving image file selected by the user, a request is given to the GDI 124 to draw an image representing the image data included in the moving image file. The GDI 124 is a computer program for uniformly managing drawings to a display device (the display 116 or the projector 200) or a printing device (a printer (not illustrated)). The GDI 124 provides a drawing related application program interface (API) called "GDI function" to the application program 122, and supports drawings by the application program 122. Note that an API is generally a collection of procedures for an application program to use various functions that an operating system has.

Therefore, using a GDI function that is an API, the application program 122 sends a request to draw a drawing representing image data included in a moving image file, for example, to the GDI 124. Note that also included in the drawing request is information relating to the image output destination (specifically, information for specifying whether to output an image to a display device or to output to a printing device).

Next, the GDI 124 receives a drawing request sent from the application program 122, checks the image output destination based on that drawing request, and if the output destination is a display device, calls the display driver 126 and the projector driver 128 and transfers the drawing request to these.

Next, the display driver 126 drives the display adapter 114 according to the transferred drawing request, and by way of the display adapter 114, expands image data in the display memory within the display adapter 114. At this time, at the application program 122, as the moving image display size, when a screen size that is expanded or reduced (hereafter abbreviated to "expanded/reduced") compared to the screen size of an image of each frame included in a moving image file (hereafter abbreviated as "expanded/reduced size") is specified, when expanding image data in the display memory, the image data included in the moving image file (hereafter called "source image data") is expanded/reduced so as to correspond to the specified expanded/reduced size. Note that the display size of a moving image is determined by a magnification set by the user in the application program 122.

Then, the display adapter 114 displays an image in the display 116 based on the image data expanded in the display memory (specifically, bit map data).

Meanwhile, like the display driver 126, the projector driver 128 also expands image data in virtual display memory allocated within the RAM 106 according to a transferred drawing request. However, in contrast to the display driver 126, when an expanded/reduced size is specified as the display size, rather than expanded/reduced image data, source image data is expanded in the virtual display memory. Position data for indicating the position for displaying a moving image (change area position) and screen size data for indicating the screen size of an expanded/reduced image (change area) are also stored. Note that as position data, normally, with the upper left peak of the overall screen as the source point, x, y coordinate data of the upper left peak of the change area is used. Also, as screen size data, width data and height data of the change area are used.

Then, the VNC server 130 detects changes in image data expanded in the virtual display memory. Then, when changes in image data are detected, supplied image data is generated according to this for supplying to the projector 200. The generated supplied image data is included in a screen update message as a parameter of a screen update message (frame buffer update) stipulated by VNC protocol and is transferred to a network interface unit 112.

Figure 4:
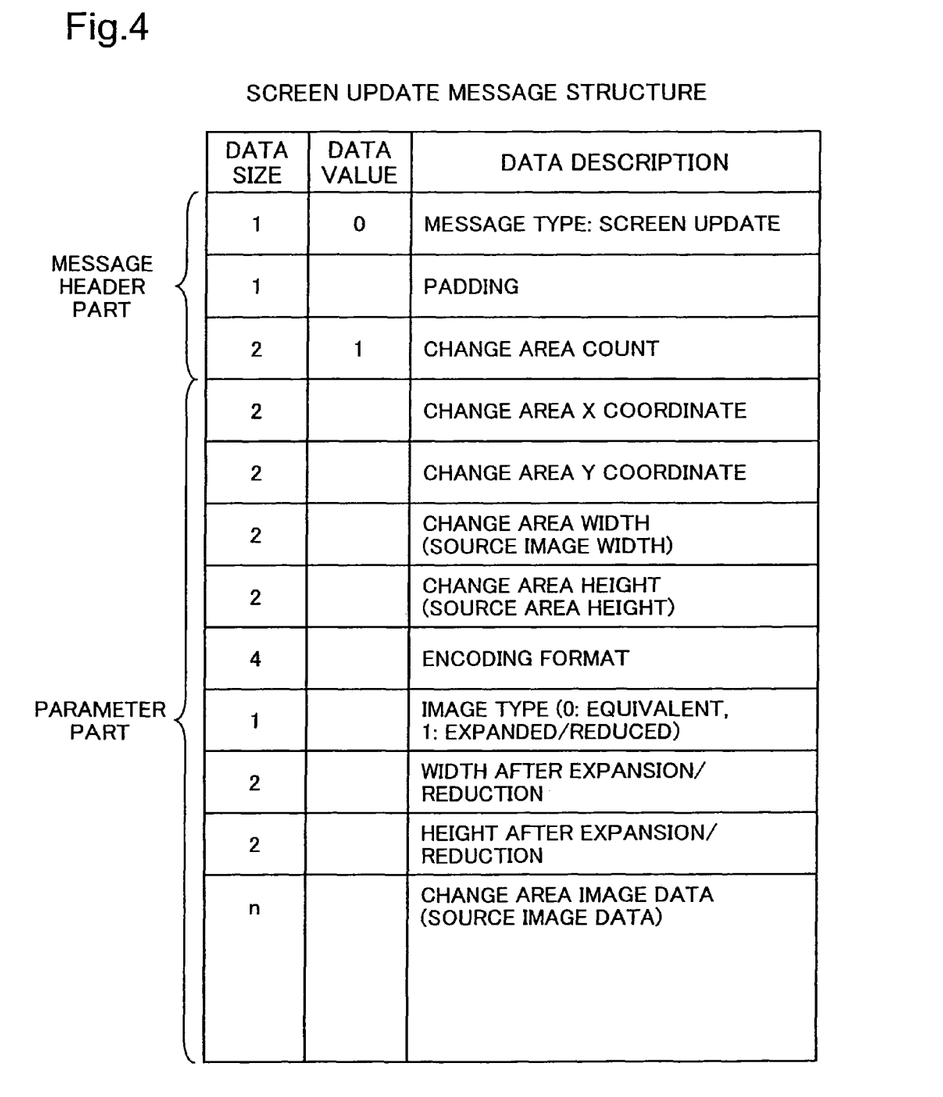
FIG. 4 is an explanatory diagram showing the structure of an image update message stipulated using VNC protocol.

FIG. 4 is an explanatory diagram showing the constitution of a screen update message stipulated by VNC protocol. As shown in FIG. 4, a screen update message comprises a message header part for indicating the type of message, and a parameter part for indicating the message parameters.

The message header part comprises a message type (1 byte) for indicating the message type, and a change area count (2 bytes) for indicating the number of rectangular areas for which an image changes in a screen, specifically, a rectangular area for which an image is updated (change area). The data value of a message type indicating an screen update message is "0." The data value of the change area count is set to "1." Note that the message type data and the change area count data are divided via 1 byte of padding.

Basically, the following data, stipulated as parameters of the screen update message, are included as supplied image data in the parameter part. Specifically included are the x coordinate (2 bytes) and y coordinate (2 bytes) of the upper left peak of the change area as position data of the change area, the width (2 bytes) and height (2 bytes) of the change area as screen size data of the change area, the image data encoding format (4 bytes) of the change area, and image data (n bytes, with n an integer of 1 or more) indicating the image of the change area. Note that the image data byte count n changes according to the encoding format and pixel count. As the encoding format, various formats such as JPEG format (data value "7") are stipulated in advance in the VNC protocol.

With this embodiment, the following data is further included as new parameters. Specifically, whether or not the change area image is an expanded/reduced image is included as the image type (1 byte), and the width (2 bytes) and height (2 bytes) after expansion/reduction are included as the expanded/reduced image screen size. As an image type data value, for example, "0" may be allocated for equivalent size images (equal size image) that are not expanded/reduced images, and "1" may be allocated for expanded/reduced images.

However, when the change area image is an equivalent size image, expansion/reduction is not performed, so the width and height after expansion/reduction are the same as the change area width and height. Therefore, even as the width and height after expansion/reduction, the width data and height data of the change area are set. Also, when the change area image is an expanded/reduced image, the width data and height data of the source image that is the expanded/reduced source are set as the width and height of the change area, and source image data is set as the change area image data.

The network interface unit 112 in FIG. 3 includes the screen update message transferred from the VNC server 130 in communication data and sends this via the network 300 to the projector 200.

At the projector 200, when the network interface unit 212 receives communication data sent from the PC 100 via the network 300, it fetches the screen update message contained in this communication data and transfers it to the VNC client 230.

The VNC client 230 transfers supplied image data contained in the transferred screen update message to the image processing driver 228.

The image processing driver 228 controls the image processing unit 214 according to the transferred supplied image data, and by way of the image processing unit 214, expands the image data in the display memory within the image processing unit 214.

Here, when the image type data included in the supplied image data indicates an equal size image (data value "0"), the image data included in the supplied image data is expanded as is in the display memory. Meanwhile, when the image type data indicates an expanded/reduced image (data value "1"), the image data included in the supplied image data is source image data, so this source image data is expanded/reduced so as to be image data equal to the screen size of the change area, and is expanded in the display memory. Note that the expansion/reduction magnification rate may be obtained easily from the width data and height data of the source image data set in place of the width data and height data of the change area, and from the width data and height data of the change area set as the width data and height data after expansion/reduction.

Then, the image processing unit 214 drives the projection unit 216 based on the image data expanded in the display memory (specifically, bit map data), and an image may be projected and displayed by way of the projection unit 216.

C. Effect:

As described above, as shown in FIG. 1, with an image display system 10 of this embodiment, it is possible to display an image on a display screen 60 of a PC 100, and also to display an image on a projections display screen 70 by way of a projector 200 connected via a network 300. It is also possible to obtain the effects described below with the image display system 10 of this embodiment.

Figure 5:
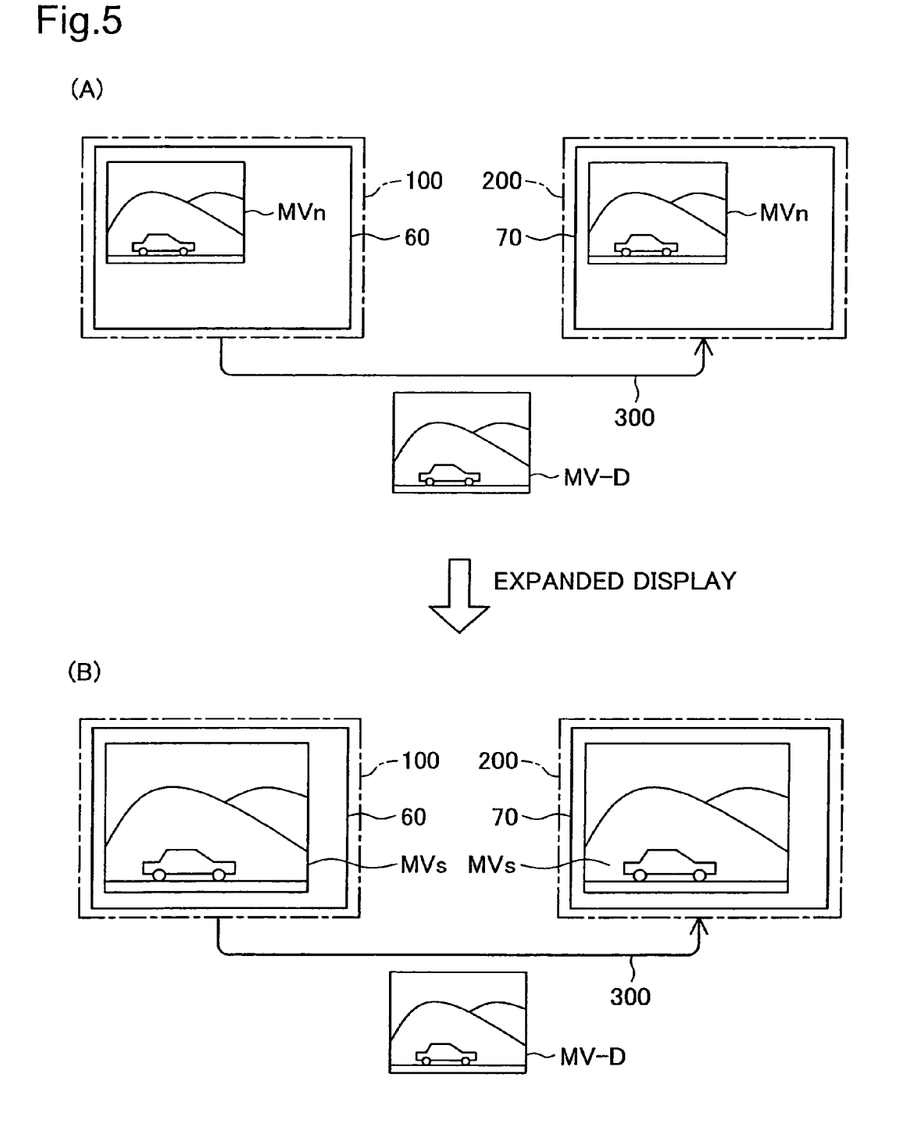
FIG. 5 is an explanatory diagram showing the effect of an image display system of this embodiment.

FIG. 5 is an explanatory diagram showing the effect of the image display system of this embodiment. With the image display system 10 of this embodiment, as shown in FIG. 5 (A), when a moving image MVn is displayed on a display screen 60 of a PC 100, image data MV-D of each frame of this moving image MVn is sent via a network 300, and this moving image MVn is displayed on a projection display screen 70 by way of a projector 200. Then, as shown in FIG. 5 (B), when the moving image MVn is expanded and an expanded moving image MVs is displayed on the display screen 60 of the PC 100, it is possible to display the expanded moving image MVs by way of the projector 200 on the projection display screen 70 as well. At this time, image data of each frame of the expanded moving image MVs sent via the network 300 from the PC 100 may be image data MV-D of each frame before expansion rather than image data for which the image data MV-D of each frame is expanded as was the case conventionally. By doing this, the volume of data actually transmitted via the network 300 can be less than when transmitting expanded image data, making it possible to inhibit an increase in network traffic, and to significantly improve the response. As a result, when a moving image is expanded and displayed, it is possible to reduce the moving image frame count and to inhibit not being able to display real time moving images.

Note that the source image described with the above embodiment correlates to the first image of the present invention, and the image after expansion/reduction correlates to the second image of the present invention.

D. Variation Example:

Note that the present invention is not limited to the embodiments and aspects noted above, and may be implemented in various aspects in a scope that does not stray from the key points.

D1. Variation Example 1:

For example, with the embodiments noted above, a case was shown with image type data included as supplied image data, but this image type data is not absolutely necessary. If the change area width data and height data contained in the supplied image data are the same as the width data and height data after expansion/reduction, the change area image may be judged to be an equivalent image. Also, if the change area width data and height data contained in the supplied image data are different from the width data and height data after expansion/reduction, and the data contained as change area width data and height data are the source image width data and height data, then the change area image may be determined to be an expanded/reduced image. Therefore, if this determination is made, it is possible to omit the image type data.

D2. Variation Example 2:

Also, with the embodiments noted above, when the change area image is an equivalent image, the same data as the change area width data and height data is set as the width data and height data after expansion/reduction. However, since it is possible to determine whether a change area image is an equivalent image or an expanded/reduced image by the image type data, when it is an equivalent image, it is possible to omit the width data and height data after expansion/reduction.

D3. Variation Example 3:

Also, with the embodiments noted above, an example was described of adding image type data, and width data and height data after expansion/reduction to the parameter of the image update message with VNC protocol, but the invention is not limited to this. For example, it is also possible to add expansion/reduction rate data and flatness data instead of width data and height data after expansion. It is also possible to newly stipulate as parameters of the screen update message supplied image data containing at least source image data that is the source of the change area image, change area position data, and source image change area size data.

D4. Variation Example 4:

The invention is not limited to a case of using screen update message for the VNC protocol, and it is also possible to supply from an image supply device to a projector via a network supplied image data containing at least source image data that is the source of the change area image, change area position data, and change area size data, and to then update the display.

D5. Variation Example 5:

Also, the embodiments noted above, a notebook PC was used as the image supply device, but it is also possible to use a desktop PC. Instead of a PC, it is also possible to use a server computer, a mobile computer, a hand held computer, a workstation or the like. Instead of these computers, it is also possible to use a device that can be connected to a network and has the same functions as a computer. Included in that kind of device would be, for example, a portable data terminal, a mobile telephone, a mail terminal, a game device, a set top box or the like.

D6. Variation Example 6:

Also, as a network, in addition to a local area network (LAN), it is also possible to use various networks such as a wide area network (WAN), the internet, intranet or the like.

The network may also be constructed as a wired network, or may be constructed as a wireless network.

What is claimed is:

1. A network image supply device for interfacing with a display device, the image supply device comprising:
   a network interface configured to interface with the display device when the display device and the image supply device are networked together; and
   a driver configured to supply an image to the display device, the driver providing:
     first image data representing the image including:
       a first predetermined height and width, and
       a data volume; and
     second image data including a second predetermined height and width, the second image data being in addition to the first image data, the first image data and the second image data being moving image data, wherein:
   the driver provides the first image data and the second image data through the network interface for use by the display device;
   the first image data is provided through the network interface without changing the data volume;
   the second predetermined height and width is selectable to be one of:
     larger than the first predetermined height and width,
     smaller than the first predetermined height and width, and
     equivalent to the first predetermined height and width;
   the second image data is configured to be used by the display device to display the image at the second predetermined height and width.

2. The image supply device in accordance with claim 1, wherein the driver further provides position data configured to be used by the display device so that the display device displays at least the image at a position indicated by the position data.

3. The image supply device in accordance with claim 1, wherein the driver further provides type data to the display device so that the display device selectively displays the image at the first predetermined height and width or the second predetermined height and width based upon the type data.

4. A projector comprising:
   a network interface configured to interfacing with an image supply device when the image supply device and the projector are networked together; and
   an image processing unit configured to process data representative of an image, the data comprising:
     first image data representing the image including a first predetermined height and width based upon an original data volume;
     second image data including a second predetermined height and width, the second image data being in addition to the first image data, the first image data and the second image data being moving image data;
   a projection unit configured to project the image, wherein:
   the network interface is structured to receive the first image data and the second image data from the image supply device and provide the first image data and the second image data to the image processing unit;
   the first image data is provided to the image processing unit without having changed the original data volume;
   the second predetermined height and width is selectable to be one of:
     larger than the first predetermined height and width,
     smaller than the first predetermined height and width, and
     equivalent to the first predetermined height and width;
   the image processing unit processes the first image data and the second image data to provide the image at the second predetermined height and width to the projection unit; and
   the projection unit projects the image that is provided.

5. A method for supplying data representative of an image, the method comprising:
   supplying first image data representing the image, the first image data including:
     a first predetermined height and width, and
     a data volume; and
   supplying second image data including a second predetermined height and width, the second image data being in addition to the first image data, the first image data and the second image data being moving image data, wherein:
   the first image data and the second image data are provided for use by a display device;
   the first image data is provided without changing the data volume;
   the second predetermined height and width is selectable to be one of:
     larger than the first predetermined height and width,
     smaller than the first predetermined height and width, and
     equivalent to the first predetermined height and width;
   the second image data is configured to be used by the display device to display the image at the second predetermined height and width.

6. A method for displaying an image comprising:
   receiving data, the data including:
     first image data representing the image including a first predetermined height and width based upon an original data volume, the data being received without having changed the original data volume;
     second image data, the second image data being in addition to the first image data and including a second predetermined height and width, the first image data and the second image data being moving image data, the second predetermined height and width being selected to be one of:
       larger than the first predetermined height and width,
       smaller than the first predetermined height and width, and
       equivalent to the first predetermined height and width;
   processing the first image data and the second image data to provide a processed image at the second predetermined height and width;
   providing the processed image for projection; and
   projecting the processed image that is provided.

7. A system configured to supply and display an image, the system comprising:
   an image providing device; and
   a projector, wherein
   the image providing device comprises:
     a first network interface that is interfaced with a second network interface in the projector when the projector and the image providing device are networked together; and
     a driver configured to supply an image to the projector, the driver providing:
       first image data representing the image including:
         a first predetermined height and width, and
         a data volume; and second image data including a second predetermined height and width, the second image data being in addition to the first image data, the first image data and the second image data being moving image data, wherein:

the driver provides the first image data and the second image data through the first network interface to the second network interface;

the first image data is provided through the first network interface without changing the data volume;

the second predetermined height and width is selectable to be one of:
- larger than the first predetermined height and width,
- smaller than the first predetermined height and width, and
- equivalent to the first predetermined height and width;

the second image data is configured to be used by the projector to display the image at the second predetermined height and width;

the projector comprises:
- the second network interface; and
- an image processing unit for processing the image;
- a projection unit for projecting the image, wherein:

the first image data and the second image data are provided to the image processing unit by the second network interface without having changed the original data volume;

the image processing unit processes the first image data and the second image data to provide the image at the second predetermined height and width to the projection unit; and the projection unit projects the image that is provided.

8. A non-transitory computer readable medium that causes a computer to function as an image supply device, the medium including instructions comprising:

supplying first image data representing the image including:
- a first predetermined height and width, and
- a data volume; and supplying second image data including a second predetermined height and width, the second image data being in addition to the first image data, the first image data and the second image data being moving image data, wherein:

the first image data and the second image data are provided for use by a display device;

the first image data is provided without changing the data volume;

the second predetermined height and width is selectable to be one of:
- larger than the first predetermined height and width,
- smaller than the first predetermined height and width, and
- equivalent to the first predetermined height and width;

the second image data is configured to be used by the display device to display the image at the second predetermined height and width.

* * * * *